(12) United States Patent
Morishima et al.

(10) Patent No.: US 11,059,243 B2
(45) Date of Patent: Jul. 13, 2021

(54) PRODUCTION DEVICE AND PRODUCTION METHOD FOR PULTRUSION MOLDED ARTICLE

(71) Applicant: MITSUBISHI HEAVY INDUSTRIES, LTD., Tokyo (JP)

(72) Inventors: Shunichi Morishima, Tokyo (JP); Toshio Kozasa, Tokyo (JP); Masatake Hatano, Tokyo (JP); Kazuaki Kishimoto, Tokyo (JP); Yukio Takeuchi, Tokyo (JP); Masayuki Yamashita, Tokyo (JP); Hitoshi Ojika, Aichi (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 193 days.

(21) Appl. No.: 16/309,607

(22) PCT Filed: Jun. 16, 2017

(86) PCT No.: PCT/JP2017/022422
§ 371 (c)(1),
(2) Date: Dec. 13, 2018

(87) PCT Pub. No.: WO2017/217552
PCT Pub. Date: Dec. 21, 2017

(65) Prior Publication Data
US 2019/0308379 A1    Oct. 10, 2019

(30) Foreign Application Priority Data

Jun. 17, 2016 (JP) .............................. JP2016-120665

(51) Int. Cl.
*B29C 70/52* (2006.01)
*B29C 70/50* (2006.01)
(Continued)

(52) U.S. Cl.
CPC .......... *B29C 70/526* (2013.01); *B29C 70/504* (2013.01); *B29C 70/52* (2013.01);
(Continued)

(58) Field of Classification Search
CPC .......... B29C 70/52–528; B29C 70/521; B29C 70/522; B29C 70/523; B29C 70/524;
(Continued)

(56) References Cited

U.S. PATENT DOCUMENTS 3,269,893 A * 8/1966 Rojecki ................ D21H 25/005
162/361
3,942,927 A   3/1976 De Mets
(Continued)

FOREIGN PATENT DOCUMENTS

CN   101588902 A   11/2009
CN   101668925 A   3/2010
(Continued)

OTHER PUBLICATIONS

Extended European Search Report for European Application No. 17813445.8 dated May 20, 2019; 9pp.
(Continued)

*Primary Examiner* — Matthew J Daniels
*Assistant Examiner* — Andrew L Swanson
(74) *Attorney, Agent, or Firm* — Hauptman Ham, LLP

(57) ABSTRACT

This device for producing a pultrusion molded article is provided with: a mold member that heats and cures an intermediate molded article as a result of the mold member contacting an intermediate molded article in which reinforcing fibers are impregnated with a thermosetting resin; a pultrusion device for extracting, in the pultruding direction, the pultrusion molded article formed by heating and curing the intermediate molded article; and a moving device for
(Continued)

moving the mold member in the pultruding direction in synchronization with the pultrusion device.

3 Claims, 8 Drawing Sheets

(51) Int. Cl.
*B30B 5/06* (2006.01)
*B29K 307/04* (2006.01)
*B29C 43/22* (2006.01)

(52) U.S. Cl.
CPC .............. *B30B 5/062* (2013.01); *B30B 5/067* (2013.01); *B29C 43/22* (2013.01); *B29K 2307/04* (2013.01)

(58) Field of Classification Search
CPC ... B29C 70/525; B29C 70/526; B29C 70/527; B29C 70/528; B29C 43/22–305
See application file for complete search history.

(56) References Cited

U.S. PATENT DOCUMENTS

| | | | |
|---|---|---|---|
| T101,401 I4 * | 1/1982 | Zion | 156/166 |
| 4,327,467 A * | 5/1982 | Quaint | B41N 7/00 492/4 |
| 7,186,361 B2 | 3/2007 | Kasai et al. | |
| 7,419,372 B2 | 9/2008 | Kasai et al. | |
| 2002/0056508 A1 * | 5/2002 | Brandstrom | B29C 70/525 156/180 |
| 2007/0175572 A1 | 8/2007 | Rubin et al. | |
| 2010/0035017 A1 * | 2/2010 | Green | D04H 3/12 428/114 |
| 2010/0059169 A1 | 3/2010 | Lengsfeld et al. | |
| 2010/0086631 A1 * | 4/2010 | Schleelein | B29C 70/525 425/155 |
| 2013/0240150 A1 | 9/2013 | Suzuki et al. | |
| 2014/0175696 A1 * | 6/2014 | Foor | B29C 70/528 264/175 |
| 2014/0251529 A1 | 9/2014 | Blot et al. | |

FOREIGN PATENT DOCUMENTS

| | | |
|---|---|---|
| CN | 103866653 A | 6/2014 |
| CN | 103958165 A | 7/2014 |
| CN | 104385631 A | 3/2015 |
| JP | S4840866 | 6/1973 |
| JP | H05338046 A | 12/1993 |
| JP | 2002127263 A | 5/2002 |
| JP | 2005059260 A | 3/2005 |

OTHER PUBLICATIONS

International Search Report and Written Opinion for International Application No. PCT/JP2017/022422 dated Jul. 25, 2017; 14pp.
Office Action for Chinese Application No. 201780036860.1 dated May 26, 2020; 13pp.

* cited by examiner

PRODUCTION DEVICE AND PRODUCTION METHOD FOR PULTRUSION MOLDED ARTICLE

RELATED APPLICATIONS

The present application is a National Phase of International Application Number PCT/JP2017/022422 filed Jun. 16, 2017 and Japanese Application Number 2016-120665 filed Jun. 17, 2016.

TECHNICAL FIELD

The present invention relates to a production device and a production method for a pultrusion molded article.

BACKGROUND ART

A composite material obtained by mixing a reinforcing fiber with a plastic material is used for aircrafts, automobiles, and ships. As a method for molding the composite material, a continuous molding method as disclosed in PTL 1 and PTL 2 is known. PTL 1 discloses the following continuous molding method. A laminated body is pinched by a pulling device located before and after a hot pressing step, and is guided to a hot press. The hot pressing step is performed in a state where tension is not applied to a prepreg fiber. PTL 2 discloses a continuous molding method using a double conveyor.

CITATION LIST

Patent Literature

[PTL 1] Japanese Unexamined Patent Application Publication No. 2005-059260
[PTL 2] Japanese Unexamined Patent Application Publication No. 05-338046

SUMMARY OF INVENTION

Technical Problem

In a case where a composite material is molded using a pultrusion molding method, an intermediate molded article having a reinforcing fiber impregnated with a thermosetting resin is introduced into a mold, and is thermally cured so as to produce a pultrusion molded article. In this way, a process for pultruding the pultrusion molded article from the mold is performed. As the thermosetting resin, an unsaturated polyester resin or a vinyl ester resin having a high curing shrinkage ratio is usually used. According to the pultrusion molding method, in a case of using the thermosetting resin having a low cure shrinkage ratio such as an epoxy resin, a frictional force inevitably increases when extracting the pultrusion molded article from the mold becomes large. If the frictional force when the pultrusion molded article is pultruded from the mold. If the frictional force increases when the pultrusion molded article is pultruded from the mold, an excessive pultruding force is required. In addition, if the frictional force increases when the pultrusion molded article is pultruded from the mold, friction against the mold causes a high possibility that surface quality of the pultrusion molded article may become poor. In addition, in order to decrease the frictional force when the pultrusion molded article is pultruded from the mold, the thermosetting resin of the intermediate molded article needs to contain a mold releasing agent in advance. If the mold releasing agent is contained in the thermosetting resin of the intermediate molded article, there is a possibility that adhesion between the produced pultrusion molded article and other components may become poor. In addition, in a case where the mold releasing agent is contained in the thermosetting resin of the intermediate molded article, it becomes necessary to perform a process for improving the adhesion of the pultrusion molded article, such as a process for removing the mold releasing agent from a surface of the pultrusion molded article after being removed from the mold. In addition, in order to improve production efficiency of the pultrusion molded article, it is necessary to pultrude the pultrusion molded article from the mold at high speed. In a case where the pultrusion molded article is pultruded at the high speed, it is necessary to lengthen the mold so as to sufficiently and thermally cure the intermediate molded article. If the mold is lengthened, the frictional force further increases when the pultrusion molded article is pultruded from the mold.

In addition, in a case where the molded article is produced using an intermittent press method of alternately performing an operation for performing press molding on a material by using a mold and an operation for feeding the molded article in a longitudinal direction by releasing the mold, the press molding and releasing the molded article are alternately performed. Consequently, the reinforcing fiber is twisted at a press molding joint portion in the molded article, thereby causing a possibility that strength of the molded article may be weakened or that a surface state of the molded article may not be uniform and quality may become poor.

The present invention aims to provide a production device and a production method for a pultrusion molded article, which can suppress friction when the pultrusion molded article is pultruded from a mold, and which can efficiently produce the pultrusion molded article showing high quality.

Solution to Problem

According to the present invention, there is provided a production device for a pultrusion molded article, which includes a mold member that thermally cures an intermediate molded article by coming into contact with the intermediate molded article having a reinforcing fiber impregnated with a thermosetting resin, a pultrusion device that causes a pultrusion molded article produced by thermally curing the intermediate molded article to be pultruded in a pultruding direction, and a moving device that moves the mold member in the pultruding direction in synchronization with the pultrusion device.

In the present invention, it is preferable that the mold member includes a first mold member and a second mold member which pinches at least a portion of the intermediate molded article between the first mold member and the second mold member, and that the moving device moves the first mold member and the second mold member in synchronization with each other.

In the present invention, it is preferable that the moving device moves the mold member so that a surface of the mold member comes into contact with the intermediate molded article in a contact section from a contact start position to a contact end position in the pultruding direction, so that the surface of the mold member is separated from the intermediate molded article at the contact end position, and so that the surface of the mold member after being separated from the intermediate molded article comes into contact with the intermediate molded article by returning to the contact start position.

In the present invention, it is preferable that the moving device moves the mold member in an annular movement route including the contact section.

In the present invention, it is preferable that the mold member includes an annular bag body which is elastically deformable, and which pressurizes the intermediate molded article.

In the present invention, it is preferable that a plurality of the mold members are disposed in the movement route, that the moving device moves a plurality of the mold members in the movement route, that the contact section is linear, and that a gap between the surfaces of the mold members in the contact section is smaller than a gap between the surfaces of the mold members in at least a portion of a non-contact section of the movement route.

In the present invention, it is preferable that the production device has a guide roller that presses the mold member against the intermediate molded article in the contact section.

According to the present invention, there is provided a production method for a pultrusion molded article, which includes a step of causing a pultrusion molded article produced by thermally curing an intermediate molded article after the intermediate molded article having a reinforcing fiber impregnated with a thermosetting resin comes into contact with a mold member, to be pultruded in a pultruding direction, and a step of moving the mold member in the pultruding direction in synchronization with an operation for pultruding the pultrusion molded article.

Advantageous Effects of Invention

According to the present invention, there are provided a production device and a production method for a pultrusion molded article, which can suppress friction when the pultrusion molded article is pultruded from a mold, and which can efficiently produce the pultrusion molded article showing high quality.

DESCRIPTION OF EMBODIMENTS

Hereinafter, embodiments according to the present invention will be described with reference to the drawings. However, the present invention is not limited thereto. In addition, configuration elements in the embodiments described below can be appropriately combined with each other. In some cases, some of the configuration elements may not be used.

In the following description, an XYZ orthogonal coordinate system is set up. A positional relationship of each element will be described with reference to the XYZ orthogonal coordinate system. One direction within a horizontal plane is set to an X-axis direction, a direction orthogonal to the X-axis direction within the horizontal plane is set to a Y-axis direction, and a direction orthogonal to each of the X-axis direction and the Y-axis direction is set to a Z-axis direction.

First Embodiment

Figure 1:
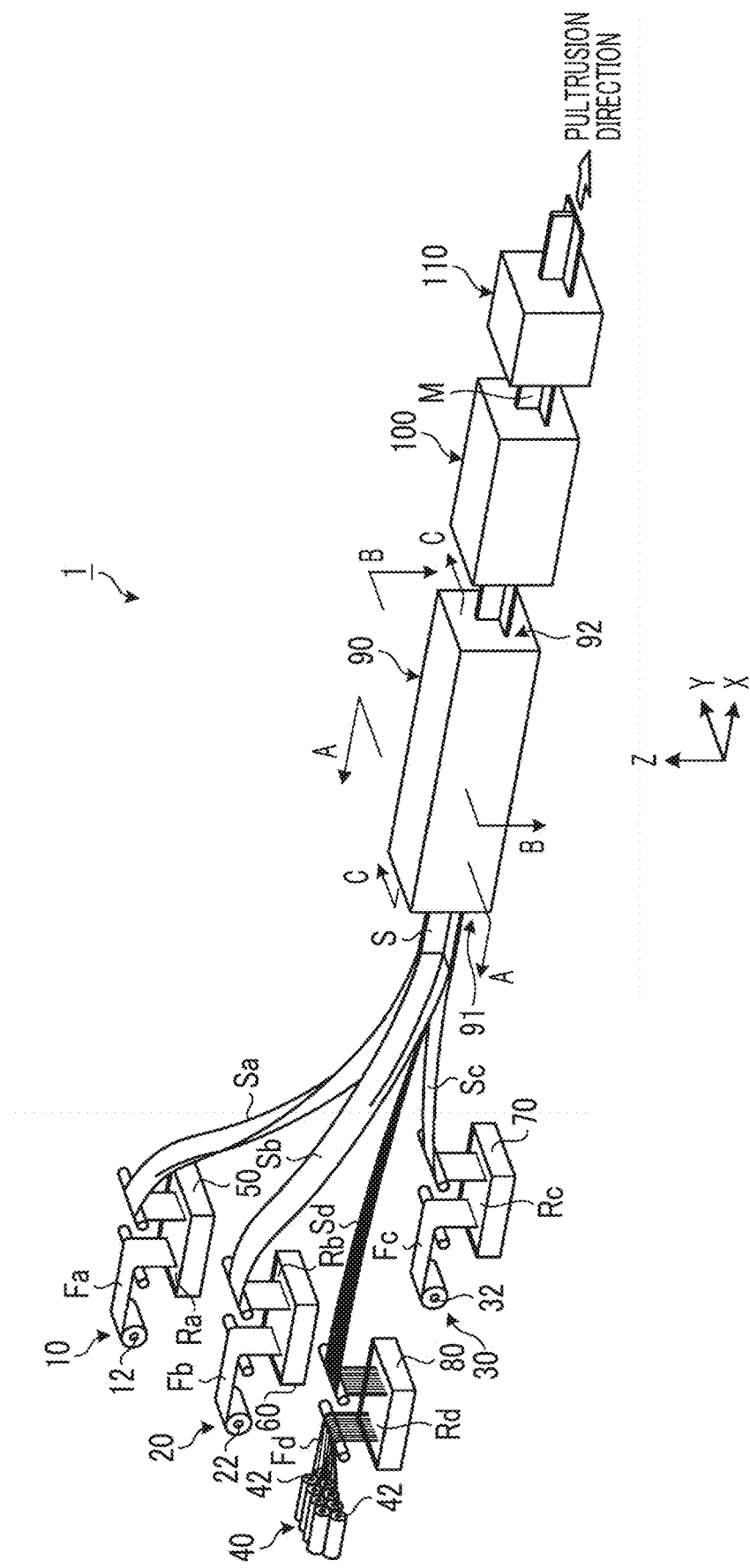
FIG. 1 is a view schematically illustrating an example of a production device for a pultrusion molded article according to a first embodiment.

A first embodiment will be described. FIG. 1 is a view schematically illustrating an example of a production device 1 for a pultrusion molded article according to the present embodiment. The production device 1 produces a pultrusion molded article M by performing pultrusion molding on an intermediate molded article S having a reinforcing fiber impregnated with a thermosetting resin.

As illustrated in FIG. 1, the production device 1 includes a reinforcing fiber sheet supply unit 10 which supplies a reinforcing fiber sheet Fa, a reinforcing fiber sheet supply unit 20 which supplies a reinforcing fiber sheet Fb, a reinforcing fiber sheet supply unit 30 which supplies a reinforcing fiber sheet Fc, a reinforcing fiber supply unit 40 which supplies a reinforcing fiber Fd, a resin tank 50 which impregnates the reinforcing fiber sheet Fa with a thermosetting resin Ra so as to produce an intermediate molded article Sa, a resin tank 60 which impregnates the reinforcing fiber sheet Fb with a thermosetting resin Rb so as to produce an intermediate molded article Sb, a resin tank 70 which impregnates the reinforcing fiber sheet Fc with a thermosetting resin Rc so as to produce an intermediate molded article Sc, a resin tank 80 which impregnates the reinforcing fiber Fd with a thermosetting resin Rd so as to produce an intermediate molded article Sd, a curing device 90 which thermally cures an intermediate molded article S including the intermediate molded article Sa, the intermediate molded article Sb, the intermediate molded article Sc, and the intermediate molded article Sd, a post curing device 100 which further thermally cures an the intermediate molded article S Is thermally cured, the post curing device 100 further thermally cures a pultrusion molded article M produced by thermally curing the intermediate molded article S in the curing device 90, and a pultrusion device 110 which causes the pultrusion molded article M to be pultruded in a pultruding direction.

The reinforcing fiber sheet supply unit 10 supplies the reinforcing fiber sheet Fa. The reinforcing fiber sheet supply unit 10 has a supply reel 12. In the supply reel 12, the continuous reinforcing fiber sheet Fa is wound in a roll shape. The reinforcing fiber sheet supply unit 10 feeds the reinforcing fiber sheet Fa from the supply reel 12.

In the present embodiment, the reinforcing fiber sheet Fa supplied from the reinforcing fiber sheet supply unit 10 is a preform sheet. The preform sheet is a sheet material in which a plurality of reinforcing fibers are aligned in a sheet shape. The preform sheet is a reinforcing fiber sheet which is not impregnated with the thermosetting resin. The reinforcing fiber sheet Fa may be a prepreg sheet. The prepreg sheet is a sheet material in which a plurality of the reinforcing fibers are aligned in a sheet shape and the sheet-shaped reinforcing fiber is impregnated with the thermosetting resin.

In the present embodiment, the reinforcing fiber which forms the reinforcing fiber sheet Fa is a carbon fiber. The reinforcing fiber which forms the reinforcing fiber sheet Fa may be at least one of a plastic fiber, a glass fiber, and a metal fiber.

The resin tank 50 impregnates the reinforcing fiber sheet Fa supplied from the reinforcing fiber sheet supply unit 10 with the thermosetting resin Ra so as to produce the intermediate molded article Sa. The resin tank 50 includes a container filled with the thermosetting resin Ra.

As the reinforcing fiber sheet Fa passes through the resin tank 50, the thermosetting resin Ra adheres to the reinforcing fiber sheet Fa so as to produce the intermediate molded article Sa. In the present embodiment, the thermosetting resin Ra contains an epoxy resin. The thermosetting resin Ra may contain at least one of an unsaturated polyester resin, a vinyl ester resin, a phenol resin, a polyurethane resin, and a silicone resin.

The reinforcing fiber sheet supply unit 20 supplies the reinforcing fiber sheet Fb. The reinforcing fiber sheet supply unit 20 has a supply reel 22. In the supply reel 22, the continuous reinforcing fiber sheet Fb is wound in a roll shape. The reinforcing fiber sheet supply unit 20 feeds the reinforcing fiber sheet Fb from the supply reel 22.

In the present embodiment, the reinforcing fiber sheet Fb supplied from the reinforcing fiber sheet supply unit 20 is the preform sheet. The reinforcing fiber sheet Fb may be the prepreg sheet.

The reinforcing fiber sheet Fb may be formed of a material the same as the reinforcing fiber sheet Fa, or may be formed of a different material. In addition, a thickness of the reinforcing fiber sheet Fb may be the same as or different from a thickness of the reinforcing fiber sheet Fa.

The resin tank 60 impregnates the reinforcing fiber sheet Fb supplied from the reinforcing fiber sheet supply unit 20 with the thermosetting resin Rb so as to produce the intermediate molded article Sb. The resin tank 60 contains a container filled with the thermosetting resin Rb.

As the reinforcing fiber sheet Fb passes through the resin tank 60, the thermosetting resin Rb adheres to the reinforcing fiber sheet Fb so as to produce the intermediate molded article Sb. The thermosetting resin Rb may be a material the same as the thermosetting resin Ra or may be a different material.

The reinforcing fiber sheet supply unit 30 supplies the reinforcing fiber sheet Fc. The reinforcing fiber sheet supply unit 30 has a supply reel 32. In the supply reel 32, the continuous reinforcing fiber sheet Fc is wound in a roll shape. The reinforcing fiber sheet supply unit 30 feeds the reinforcing fiber sheet Fc from the supply reel 32.

In the present embodiment, the reinforcing fiber sheet Fc supplied from the reinforcing fiber sheet supply unit 30 is the preform sheet. The reinforcing fiber sheet Fc may be the prepreg sheet.

The reinforcing fiber sheet Fc may be formed of a material the same as at least any one of the reinforcing fiber sheet Fa and the reinforcing fiber sheet Fb, or may be formed of a material different from the reinforcing fiber sheet Fa and the reinforcing fiber sheet Fb. In addition, the thickness of the reinforcing fiber sheet Fc may be the same as the thickness of at least any one of the reinforcing fiber sheet Fa and the reinforcing fiber sheet Fb, or may be different from the thickness of the reinforcing fiber sheet Fa and the reinforcing fiber sheet Fb.

The resin tank 70 impregnates the reinforcing fiber sheet Fc supplied from the reinforcing fiber sheet supply unit 30 with the thermosetting resin Rc so as to produce the intermediate molded article Sc. The resin tank 70 contains a container filled with the thermosetting resin Rc.

As the reinforcing fiber sheet Fc passes through the resin tank 70, the thermosetting resin Rc adheres to the reinforcing fiber sheet Fc so as to produce the intermediate molded article Sc. The thermosetting resin Rc may be a material the same as at least any one of the thermosetting resin Ra and the thermosetting resin Rb, or may be a material different from the thermosetting resin Ra and the thermosetting resin Rb.

The reinforcing fiber supply unit 40 supplies the reinforcing fiber Fd. In the present embodiment, the reinforcing fiber Fd is the carbon fiber. The reinforcing fiber Fd may be at least one of the plastic fiber, the glass fiber, and the metal fiber.

The reinforcing fiber supply unit 40 includes a plurality of bobbins 42. In each of the plurality of bobbins 42, the continuous reinforcing fiber Fd is wound. The reinforcing fiber supply unit 40 feeds the reinforcing fiber Fd from each of the plurality of bobbins 42.

The resin tank 80 impregnates the reinforcing fiber Fd supplied from the reinforcing fiber supply unit 40 with the thermosetting resin Rd so as to produce the intermediate molded article Sd. The resin tank 80 contains a container filled with the thermosetting resin Rd.

As the reinforcing fiber Fd passes through the resin tank 80, the thermosetting resin Rd adheres to the reinforcing fiber Fd so as to produce the intermediate molded article Sd. The thermosetting resin Rd may be a material the same as at least any one of the thermosetting resin Ra, the thermosetting resin Rb, and the thermosetting resin Rc, or may be a material different from the thermosetting resin Ra, the thermosetting resin Rb, and the thermosetting resin Rc. The intermediate molded article Sd may be a gap material. The gap material is obtained by bundling the reinforcing fiber Fd or the reinforcing fiber sheet so as to be impregnated with the thermosetting resin.

The intermediate molded article Sa, the intermediate molded article Sb, the intermediate molded article Sc, and the intermediate molded article Sd are supplied to the curing device 90 after being aggregated. In the following description, an aggregated body of the intermediate molded article Sa, the intermediate molded article Sb, the intermediate molded article Sc, and the intermediate molded article Sd will be appropriately referred to as an intermediate molded article S.

The curing device 90 thermally cures and molds the intermediate molded article S having the reinforcing fiber impregnated with the thermosetting resin. The thermosetting resin contained in the intermediate molded article S is thermally cured in the curing device 90, thereby forming the pultrusion molded article M.

The curing device 90 has an entrance 91 of the intermediate molded article S and an exit 92 of the pultrusion molded article M produced in the curing device 90. The intermediate molded article S is introduced into the curing device 90 via the entrance 91.

The post curing device 100 further heats and pressurizes the pultrusion molded article M produced in the curing device 90. In the present embodiment, the curing device 90 heats the intermediate molded article S so that the thermosetting resin contained in the intermediate molded article S is brought into a semi-cured state. The curing device 90 heats the intermediate molded article S so as to produce the pultrusion molded article M containing the thermosetting resin in the semi-cured state. The post curing device 100 heats the pultrusion molded article M so that the thermosetting resin in the semi-cured state thermosetting resin which is contained in the pultrusion molded article M supplied from the curing device 90 is brought into a cured state. The intermediate molded article S is sufficiently and thermally cured by the curing device 90 and the post curing device 100.

The thermosetting resin in the semi-cured state means that the thermosetting resin is cured beyond a softened state, but is in a state where the thermosetting resin is not completely cured. The thermosetting resin is in a state where thermosetting reaction is available by heating the thermosetting resin. The thermosetting resin in the semi-cured state has a self-supporting property, and can hold a shape even in a state where the thermosetting resin is not supported by a support body. The thermosetting resin in the cured state is in a state after thermosetting resin is thermally cured, and is in a state where the thermosetting reaction is not available even if the thermosetting resin is heated. The thermosetting resin in the cured state has the self-supporting property, and can hold the shape even in a state where the thermosetting resin is not supported by the support body.

The pultrusion device 110 pultrudes the pultrusion molded article M from the curing device 90 and the post curing device 100. The pultrusion device 110 causes the pultrusion molded article M produced by thermally curing the intermediate molded article S introduced into the curing device 90 to be pultruded from the curing device 90 via the post curing device 100 in the pultruding direction. In the present embodiment, the pultruding direction is a +X-direction.

In the present embodiment, the reinforcing fiber sheet Fa is continuously supplied from the reinforcing fiber sheet supply unit 10. The reinforcing fiber sheet Fb is continuously supplied from the reinforcing fiber sheet supply unit 20. The reinforcing fiber sheet Fc is continuously supplied from the reinforcing fiber sheet supply unit 30. The reinforcing fiber Fd is continuously supplied from the reinforcing fiber supply unit 40. The intermediate molded article S is continuously introduced into the curing device 90 from the entrance 91 of the curing device 90. The pultrusion device 110 continuously pultrudes the pultrusion molded article M. That is, in the present embodiment, the production device 1 performs continuous pultrusion molding.

Figure 2:
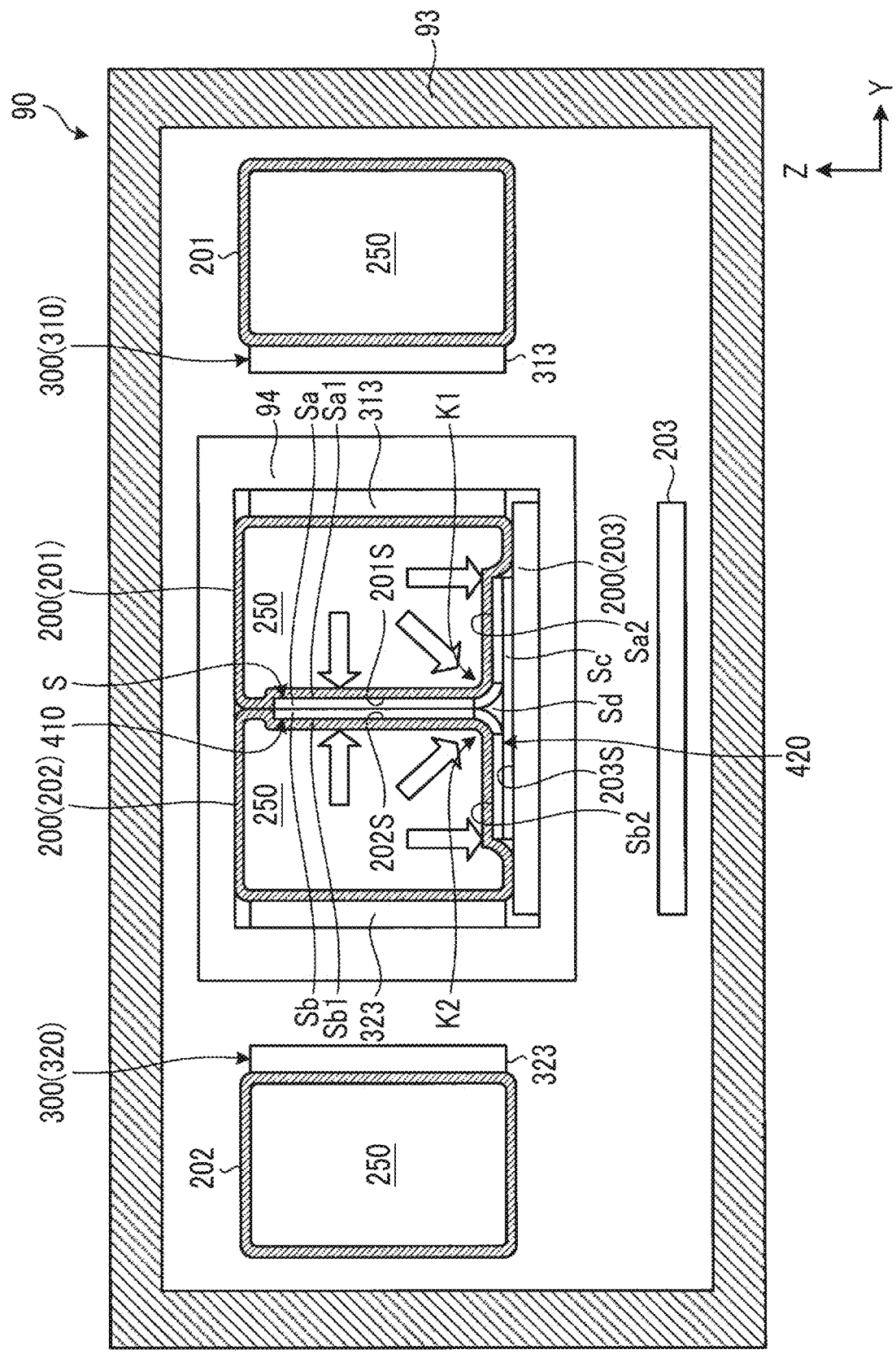
FIG. 2 is a sectional view schematically illustrating a curing device according to the first embodiment.
Figure 3:
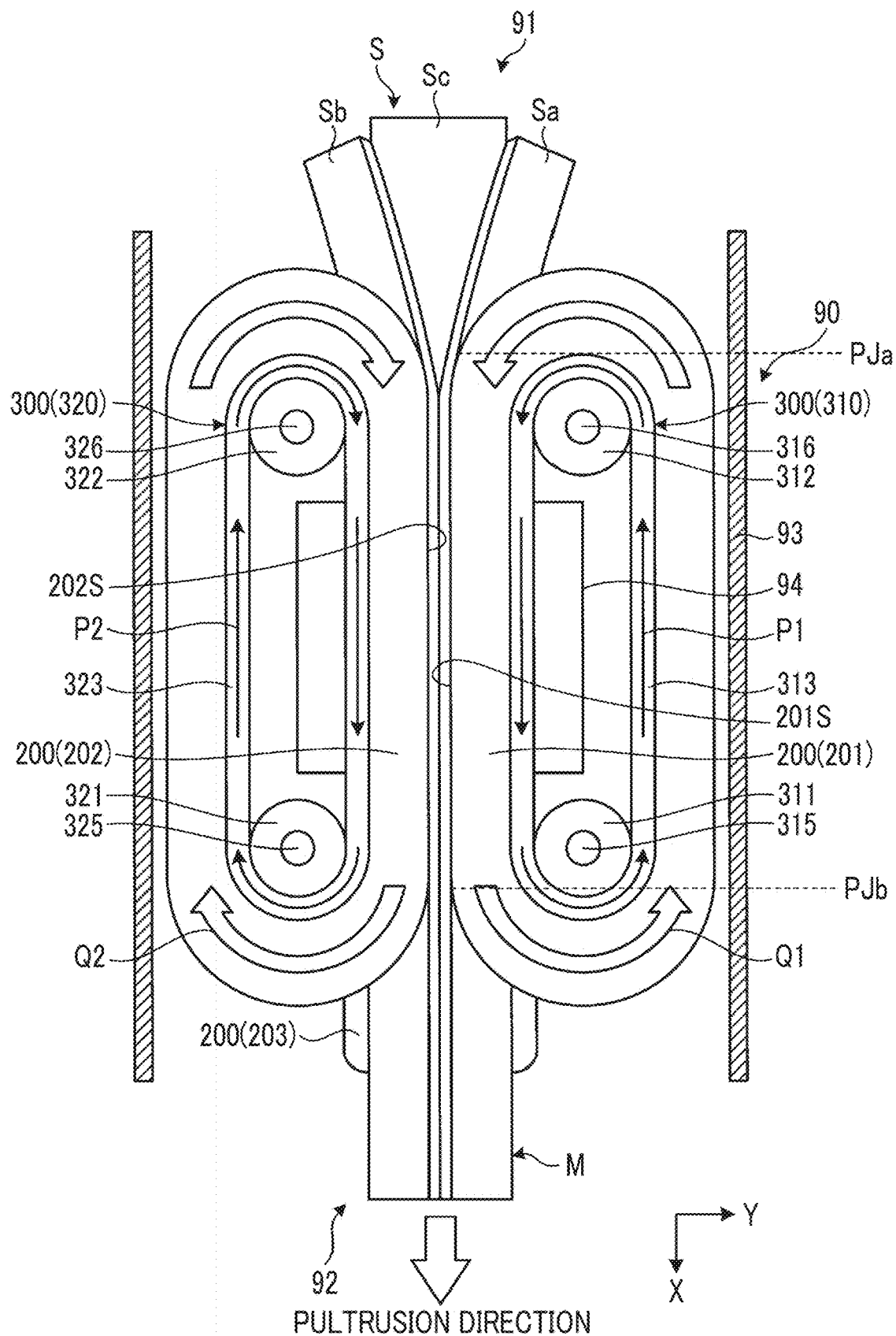
FIG. 3 is a sectional view schematically illustrating the curing device according to the first embodiment.
Figure 4:
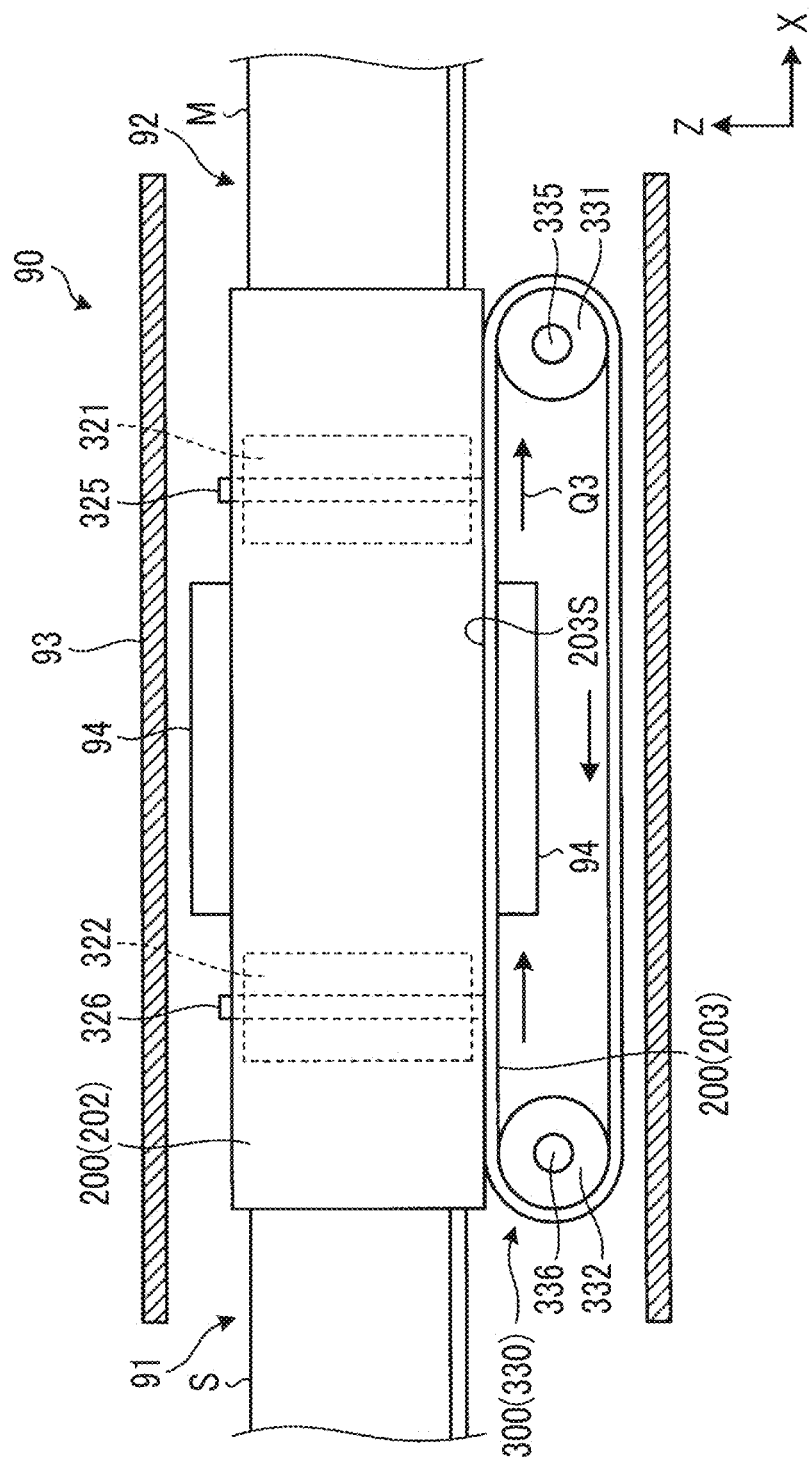
FIG. 4 is a sectional view schematically illustrating the curing device according to the first embodiment.

FIG. 2 is a sectional view schematically illustrating the curing device 90 according to the present embodiment, and corresponds to a sectional view taken along arrow line A-A in FIG. 1. FIG. 3 is a sectional view schematically illustrating the curing device 90 according to the present embodiment, and corresponds to a sectional view taken along arrow line B-B in FIG. 1. FIG. 4 is a sectional view schematically illustrating the curing device 90 according to the present embodiment, and corresponds to a sectional view taken along arrow line C-C in FIG. 1.

As illustrated in FIGS. 2, 3, and 4, the curing device 90 includes a housing 93, a mold member 200 which is disposed inside the housing 93 and comes into contact with the intermediate molded article S introduced into the housing 93 so as to thermally cure the intermediate molded article S, and a moving device 300 which moves the mold member 200 in contact with the intermediate molded article S in synchronization with the pultrusion device 110 in the +X-direction which is the pultruding direction.

The entrance 91 and the exit 92 of the curing device are disposed in the housing 93. The intermediate molded article S is loaded into the housing 93 via the entrance 91. The pultrusion molded article M produced by coming into contact with the mold member 200 located inside the housing 93 is unloaded outward of the housing 93 via the exit 92. The intermediate molded article S enters the inside of the housing 93 via the entrance 91, and moves inside the housing 93 in the +X-direction. Thereafter, the intermediate molded article S is unloaded outward of the housing 93 via the exit 92.

The mold member 200 is an annular member. The mold member 200 comes into contact with the intermediate molded article S introduced into the housing 93 via the entrance 91. In the present embodiment, the mold member 200 includes an annular body 201, an annular body 202, and an annular body 203.

The annular body 201 and the annular body 202 are annular bag bodies. For example, the annular body 201 and the annular body 202 are members made of silicone rubber in a balloon shape, and are elastically deformable. The annular body 201 and the annular body 202 can pressurize the intermediate molded article S.

The annular body 201 and the annular body 202 respectively have an internal space 250. The internal space 250 accommodates a fluid. The fluid in the internal space 250 may be gas or a liquid.

The annular body 203 is an annular belt body. For example, the annular body 203 is a conveyor belt made of metal or a synthetic resin.

The moving device 300 moves a contact surface of the mold member 200 in contact with the intermediate molded article S in the +X-direction. The moving device 300 includes a moving device 310 which moves the annular body 201, a moving device 320 which moves the annular body 202, and a moving device 330 which moves the annular body 203.

As illustrated in FIG. 3, the moving device 310 has a conveyor belt 313 connected to an inner surface of the annular body 201, two sprockets 311 and 312 for supporting the conveyor belt 313, a driving shaft 315 for supporting the sprocket 311, and a driven shaft 316 for supporting the sprocket 312.

The driving shaft 315 is connected to an actuator, and is rotated by an operation of the actuator. The driven shaft 316 is rotatably supported by a support mechanism. If the driving shaft 315 is rotated, the sprocket 311 is rotated. If the sprocket 311 is rotated, the conveyor belt 313 supported by the sprocket 311 and the sprocket 312 is rotated in a direction indicated by an arrow P1 in FIG. 3. If the conveyor belt 313 is rotated, the annular body 201 connected to the conveyor belt 313 is rotated in a direction indicated by an arrow Q1 in FIG. 3. A rotation direction of the annular body 201 is determined so that a contact surface 201S in contact with the intermediate molded article S in the annular body 201 moves in the +X-direction.

As illustrated in FIG. 3, the moving device 320 has a conveyor belt 323 connected to the inner surface of the annular body 202, two sprockets 321 and 322 for supporting the conveyor belt 323, a driving shaft 325 for supporting the sprocket 321, and a driven shaft 326 for supporting the sprocket 322.

The driving shaft 325 is connected to an actuator, and is rotated by an operation of the actuator. The driven shaft 326 is rotatably supported by a support mechanism. If the driving shaft 325 is rotated, the sprocket 321 is rotated. If the sprocket 321 is rotated, the conveyor belt 323 supported by the sprocket 321 and the sprocket 322 is rotated in a direction indicated by an arrow P2 in FIG. 3. If the conveyor belt 323 is rotated, the annular body 202 connected to the conveyor belt 323 is rotated in a direction indicated by an arrow Q2 in FIG. 3. A rotation direction of the annular body 202 is determined so that a contact surface 202S in contact with the intermediate molded article S in the annular body 202 moves in the +X-direction.

As illustrated in FIG. 4, the moving device 330 has two sprockets 331 and 332 for supporting the annular body 203, a driving shaft 335 for supporting the sprocket 331, and a driven shaft 336 for supporting the sprocket 332.

The driving shaft 335 is connected to an actuator, and is rotated by an operation of the actuator. The driven shaft 336 is rotatably supported by a support mechanism. If the driving shaft 335 is rotated, the sprocket 331 is rotated. If the sprocket 331 is rotated, the annular body 203 supported by the sprocket 331 and the sprocket 332 is rotated in a direction indicated by an arrow Q3 in FIG. 4. A rotation direction of the annular body 203 is determined so that a contact surface 203S in contact with the intermediate molded article S in the annular body 203 moves in the +X-direction.

As illustrated in FIG. 2, in the present embodiment, a cross-sectional shape of the intermediate molded article S is a so-called T-shape. The intermediate molded article S has a first plate portion 410 and a second plate portion 420 substantially orthogonal to the first plate portion 410. A first bent portion K1 and a second bent portion K2 are disposed between the first plate portion 410 and the second plate portion 420.

The first plate portion 410 is formed by joining a portion of the intermediate molded article Sa and a portion of the intermediate molded article Sb to each other. The second plate portion 420 is formed by joining a portion of the intermediate molded article Sa and a portion of the intermediate molded article Sb to the intermediate molded article Sc.

In the following description, a portion forming the first plate portion 410 in the intermediate molded article Sa will be appropriately referred to as a portion Sa2, and a portion forming the second plate portion 420 in the intermediate molded article Sa will be appropriately referred to as a portion Sa2. The portion Sa1 and the portion Sa2 are linked with each other via the first bent portion K1.

In addition, in the following description, a portion forming the first plate portion 410 in the intermediate molded article Sb will be appropriately referred to as a portion Sb1, and a portion forming the second plate portion 420 in the intermediate molded article Sb will be appropriately referred to as a portion Sb2. The portion Sb1 and the portion Sb2 are linked with each other via the second bent portion K2.

The intermediate molded article Sd is located in a space among the first bent portion K1 of the intermediate molded article Sa, the first bent portion K2 of the intermediate molded article Sb, and the intermediate molded article Sc.

In a YZ-plane orthogonal to the pultruding direction, a plurality of the mold members 200 (the annular body 201, the annular body 202, and the annular body 203) are located around the intermediate molded article S. In the present embodiment, the annular body 201 is located so as to be in contact with the intermediate molded article Sa, the annular body 202 is located so as to be in contact with the intermediate molded article Sb, the annular body 203 is located so as to be in contact with the intermediate molded article Sc.

The annular body 201 and the annular body 202 are located so as to pinch the first plate portion 410 including the portion Sa1 and the portion Sb1.

The annular body 201 and the annular body 203 are located so as to pinch a portion of the second plate portion 420 including the portion Sat and a portion of the intermediate molded article Sc.

The annular body 202 and the annular body 203 are located so as to pinch a portion of the second plate portion 420 including the portion Sb2 and a portion of the intermediate molded article Sc.

The annular body 201 comes into contact with each of a surface of the portion Sa1, a surface of the portion Sa2, and a surface of the first bent portion K1. The annular body 201 is an elastically deformable bag body, and can sufficiently come into contact with not only the surface of the portion Sa1 and the surface of the portion Sa2 but also the surface of the first bent portion K1.

The annular body 202 comes into contact with each of a surface of the portion Sb1, a surface of the portion Sb2, and a surface of the second bent portion K2. The annular body 202 is an elastically deformable bag body, and can sufficiently come into contact with not only the surface of the portion Sb1 and the surface of the portion Sb2 but also the surface of the second bent portion K2.

The annular body 203 comes into contact with a surface of the intermediate molded article Sc.

The curing device 90 has a frame member 94 located around the intermediate molded article S moving in the pultruding direction. As illustrated in FIG. 2, in the YZ-plane orthogonal to the pultruding direction, the frame member 94 has a rectangular shape.

A portion of the annular body 201 including the contact surface 201S is located inside the frame member 94, and the other portion of the annular member 201 is located outside the frame member 94. In addition, a portion of the conveyor belt 313 is located inside the frame member 94, and the other portion of the conveyor belt 313 is located outside the frame member 94.

A portion of the annular body 202 including the contact surface 202S is located inside the frame member 94, and the other portion of the annular member 202 is located outside the frame member 94. In addition, a portion of the conveyor belt 323 is located inside the frame member 94, and the other portion of the conveyor belt 323 is located outside the frame member 94.

A portion of the annular body 203 including the contact surface 203S is located inside the frame member 94, and the other portion of the annular member 203 is located outside the frame member 94.

That is, the intermediate molded article S, a portion of the annular body 201, a portion of the annular body 202, and a portion of the annular body 203 are located inside the frame member 94. The portion of the annular body 201 and the portion of the annular body 202 are pressed into the frame member 94, thereby pinching and pressurizing the first plate portion 410 of the intermediate molded article S. In addition, the portion of the annular body 201 and the portion of the annular body 202 which are pressed into the frame member 94 pinch and pressurize the second plate portion 420 of the intermediate molded article S, with the annular body 203.

In addition, in the present embodiment, a heater is located inside the frame member 94. The frame member 94 heats the annular body 201, the annular body 202, and the annular body 203. Heat generated in the frame member 94 by the heater is transferred to the intermediate molded article S via the annular body 201, the annular body 202, and the annular body 203. In this manner, the intermediate molded article S is heated and pressurized.

In the present embodiment, the moving device 300 (the moving device 310, the moving device 320, and the moving device 330) moves the plurality of mold members 200 (the annular body 201, the annular body 202, and the annular body 203) in synchronization with each other. The moving device 300 rotates the annular body 201, the annular body 202, and the annular body 203 so that the contact surface 201S, the contact surface 202S, and the contact surface 203S move in the +X-direction at the same speed.

In the present embodiment, the moving device 300 rotates the annular body 201, the annular body 202, and the annular body 203 in synchronization with a pultrusion operation of the pultrusion device 110. The pultrusion device 110 moves the pultrusion molded article M in the +X-direction at predetermined pultruding speed. The moving device 300 rotates the annular body 201, the annular body 202, and the annular body 203 so that the contact surface 201S, the contact surface 202S, and the contact surface 203S move in the +X-direction at the moving speed the same as the pultruding speed of the pultrusion device 110.

A portion of the surface of the annular body 201 rotated in the direction indicated by arrow Q1 by the operation of the moving device 310 starts to come into contact with the intermediate molded article S at a contact start position PJa in the vicinity of the entrance 91. The surface (contact surface 201S) of the annular body 201 in contact with the intermediate molded article S moves together with the intermediate molded article S to a contact end position PJb in the vicinity of the exit 92. The surface of the annular body 201 is separated from the intermediate molded article S at the contact end position PJb. The annular body 201 is rotated in the direction indicated by the arrow Q1. In this manner, the surface of the annular body 201 separated from the intermediate molded article S at the contact end position PJb returns to the contact start position PJa, and comes into contact with the intermediate molded article S again.

Similarly, the surface of the annular body 202 rotated in the direction indicated by arrow Q2 by the operation of the moving device 320 comes into contact with the intermediate molded article S at the contact start position PJa, is separated from the intermediate molded article S at the contact end position PJb, returns to the contact start position PJa, and comes into contact with the intermediate molded article S again.

Similarly, the surface of the annular body 203 rotated in the direction indicated by arrow Q3 by the operation of the moving device 330 comes into contact with the intermediate molded article S at the contact start position PJa, is separated from the intermediate molded article S at the contact end position PJb, returns to the contact start position PJa, and comes into contact with the intermediate molded article S again.

In this way, in the present embodiment, the mold member 200 (the annular body 201, the annular body 202, and the annular body 203) moves so as to circulate the annular movement route.

In the following description, a section from the contact start position PJa to the contact end position PJb will be appropriately referred to as a contact section in the annular movement route where the mold member 200 moves. In the contact section, the surface of the mold member 200 is the contact surface which comes into contact with the intermediate molded article S. In addition, a section other than the contact section in the annular movement route where the mold member 200 moves will be appropriately referred to as a non-contact section. In the non-contact section, the surface of the mold member 200 does not come into contact with the intermediate molded article S.

As illustrated in FIG. 3, the contact section is linear. The contact surface 201S, the contact surface 202S, and the contact surface 203S move in synchronization with each other so as to be parallel to the X-axis in the contact section.

Figure 5:
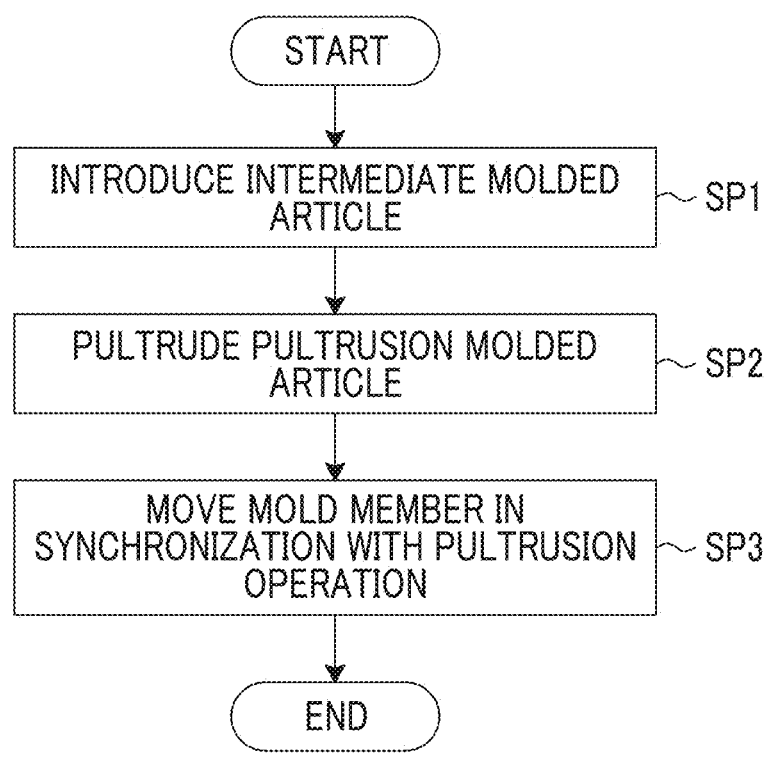
FIG. 5 is a flowchart illustrating an example of a production method for the pultrusion molded article according to the first embodiment.

Next, an example of a production method for the pultrusion molded article M according to the present embodiment will be described. FIG. 5 is a flow chart illustrating the example of the production method for the pultrusion molded article M according to the present embodiment.

The intermediate molded article S is introduced into the housing 93 of the curing device 90 via the entrance 91 (Step SP1).

The intermediate molded article S is inserted among the annular body 201, the annular body 202, and the annular body 203. The moving device 300 including the moving device 310, the moving device 320, and the moving device 330 moves the contact surface 201S of the annular body 201, the contact surface 202S of the annular body 202, and the contact surface 203S of the annular body 203 in the +X-direction in synchronization with each other.

The annular body 201, the annular body 202, and the annular body 203 which are located inside the frame member 94 come into contact with the intermediate molded article S so as to heat and pressurize the intermediate molded article S. In this manner, the intermediate molded article S is thermally cured so as to produce the pultrusion molded article M.

The pultrusion device 110 pultrudes the pultrusion molded article M produced from the curing device 90 from the curing device 90 (Step SP2).

The moving device 300 moves the contact surface 201S of the annular body 201, the contact surface 202S of the annular body 202, and the contact surface 203S of the annular body 203 in the +X-direction in synchronization with the operation of the pultrusion device 110 for pultruding the pultrusion molded article M (Step SP3). The moving device 300 rotates the annular body 201, the annular body 202, and the annular body 203 so that the pultruding speed of the pultrusion molded article M pultruded by the pultrusion device 110, the moving speed of the contact surface 201S of the annular body 201, and the moving speed of the contact surface 202S of the annular body 202, and the moving speed of the contact surface 203S of the annular body 203 are the same as each other.

The moving device 300 moves the mold member 200 (the annular body 201, the annular body 202, and the annular body 203) in the annular movement route including the contact section. In the present embodiment, the moving device 300 moves the mold member 200 as follows. The surface of the mold member 200 (the annular body 201, the annular body 202, and the annular body 203) comes into contact with the intermediate molded article S in the contact section from the contact start position PJa to the contact end position PJb in the pultruding direction, and is separated from the intermediate molded article S at the contact end position PJb. The surface of the mold member 200 after being separated from the intermediate molded article S returns to the contact start position PJa, and comes into contact with the intermediate molded article S again.

As described above, according to the present embodiment, the mold member 200 for thermally curing the intermediate molded article S is moved in the pultruding direction in synchronization with the pultrusion operation performed by the pultrusion device 110. Accordingly, relative speed decreases between the intermediate molded article S and the mold member 200 which move in the pultruding direction. Since the relative speed decreases between the intermediate molded article S and the mold member 200, a frictional force decreases between the intermediate molded article S and the mold member 200. In this manner, it is possible to suppress friction when the pultrusion molded article M is pultruded, and it is possible to efficiently produce the pultrusion molded article M showing high quality.

In addition, in the present embodiment, the plurality of mold members 200 (the annular body 201, the annular body 202, and the annular body 203) which pinch and pressurize the intermediate molded article S move in synchronization with each other. Accordingly, the friction decreases between the intermediate molded article S and each of the plurality of mold members 200. Therefore, the friction is suppressed when the pultrusion molded article M is pultruded.

In addition, in the present embodiment, the mold member 200 which thermally cures the intermediate molded article S in the contact section is separated from the intermediate molded article S at the contact end position PJb, and returns to the contact start position PJa. Thereafter, the mold member 200 comes into contact with the intermediate molded article S again at the contact start position PJa. That is, the mold member 200 is moved so as to circulate in the annular movement route. In this manner, it is possible to suppress a size increase in the production device 1, and it is possible to efficiently and thermally cure the intermediate molded article S.

In addition, in the present embodiment, the elastically deformable bag body is employed as the annular body 201 and the annular body 202. In this manner, when the thickness of the intermediate molded article S introduced into the curing device 90 is changed, the bag body is elastically deformed in response to a change in the thickness of the intermediate molded article S. In this manner, in a case where the thick intermediate molded article S is introduced, a possibility is suppressed that excessive pressure may be applied to the intermediate molded article S. In a case where the thin intermediate molded article S is introduced, a possibility is suppressed that the intermediate molded article S may be insufficiently pressurized. Therefore, even if the thickness of the introduced intermediate molded article S is changed, a possibility is suppressed that the quality of the produced pultrusion molded article M may become poor.

In addition, as the elastic body, the balloon-shaped bag body is employed. In this manner, even if the intermediate molded article S having a bent portion or a corner portion such as the first bent portion K1 and the second bent portion K2 is introduced, the bag body can be deformed along the outer shape of the intermediate molded article S so as to conform to the outer shape of the intermediate molded article S, and come into contact with the surface of the first bent portion K1 and the surface of the second bent portion K2. The entire surface of the intermediate molded article S and the bag body are sufficiently in contact with each other. Therefore, the intermediate molded article S is very precisely molded.

In the present embodiment, the post curing device 100 may be omitted. The intermediate molded article S may be thermally cured using only the curing device 90.

In the present embodiment, for example, a metal or reinforced plastic plate member may be located among the annular body 201 and the annular body 202 which are the bag bodies, and the intermediate molded article S. The highly rigid plate member is brought into contact with the intermediate molded article S. Accordingly, the intermediate molded article S is very precisely molded.

Figure 6:
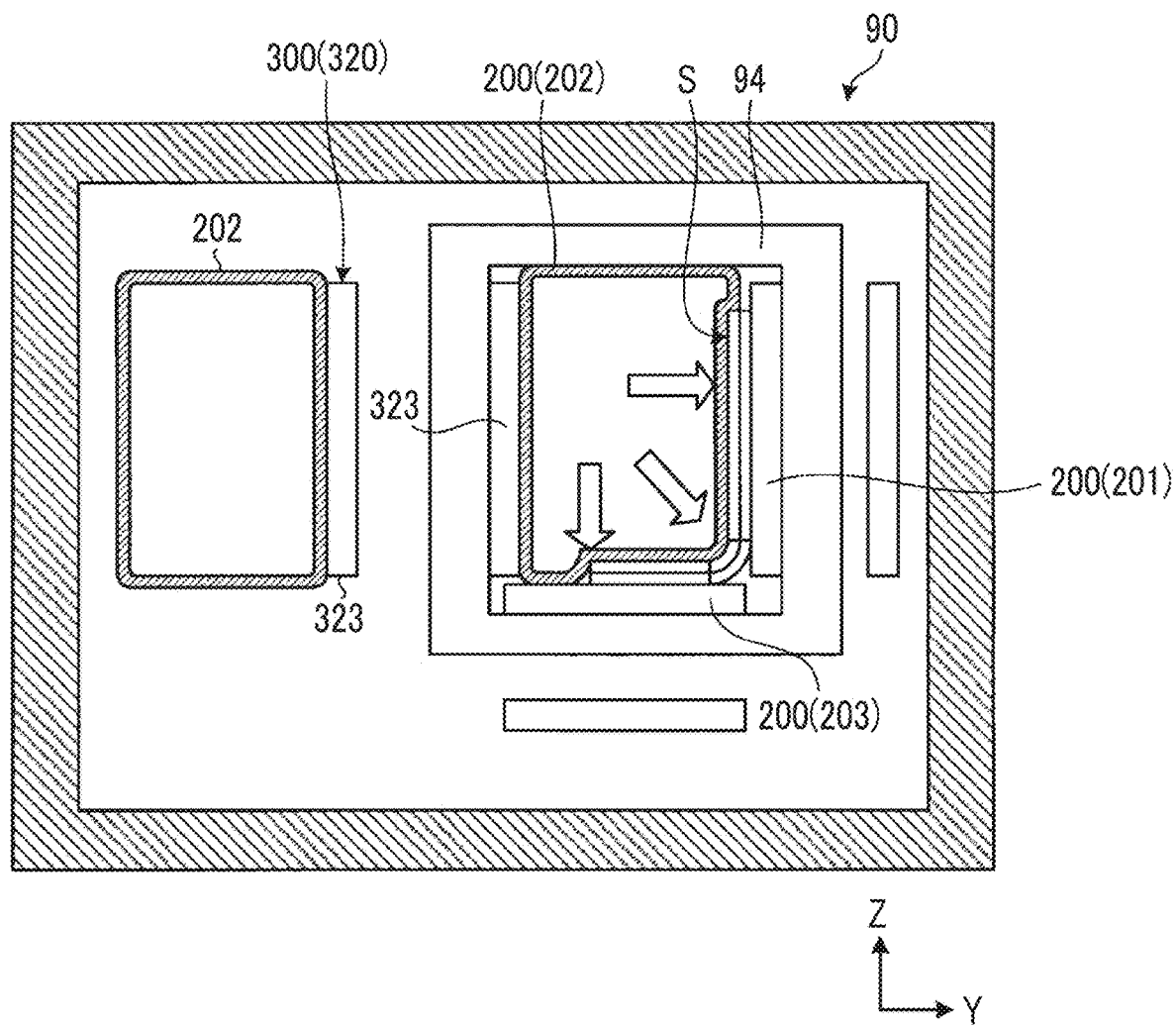
FIG. 6 is a sectional view schematically illustrating the curing device according to the first embodiment.

In the present embodiment, the cross-sectional shape of the intermediate molded article S is a so-called T-shape, and is set to have a line-symmetric shape. The cross-sectional shape of the intermediate molded article S may not be the line-symmetric shape. For example, as illustrated in FIG. 6, the cross-sectional shape of the intermediate molded article S may be a so-called L-shape. In FIG. 6, the annular body 201 is a belt body such as a conveyor belt. The annular body 202 is the elastically deformable bag body. The annular body 203 is the belt body such as the conveyor belt.

Second Embodiment

A second embodiment will be described. In the following description, the same reference numerals will be given to configuration elements the same as or equivalent to those according to the above-described embodiment, and description thereof will be simplified or omitted.

Figure 7:
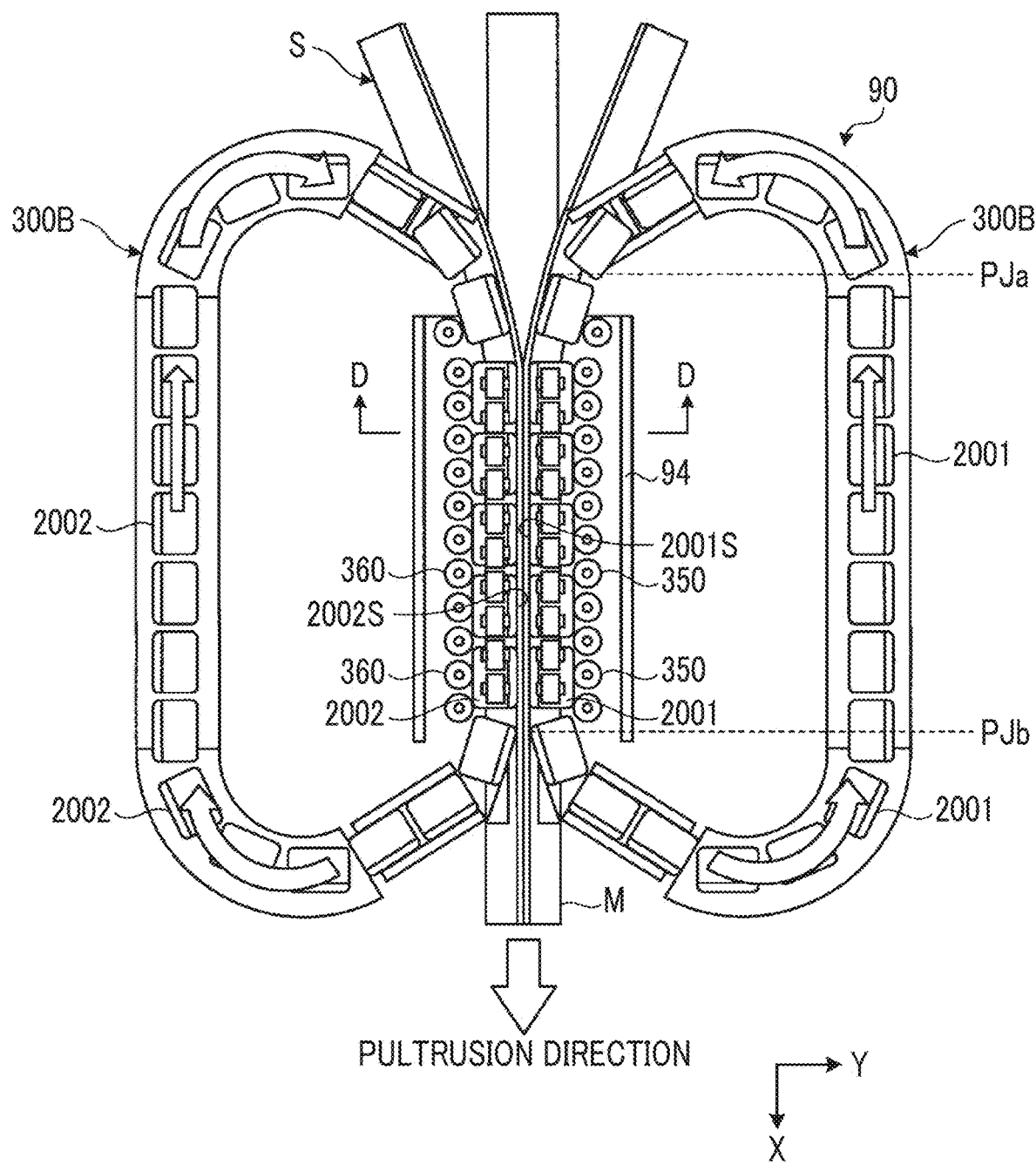
FIG. 7 is a sectional view schematically illustrating a curing device according to a second embodiment.
Figure 8:
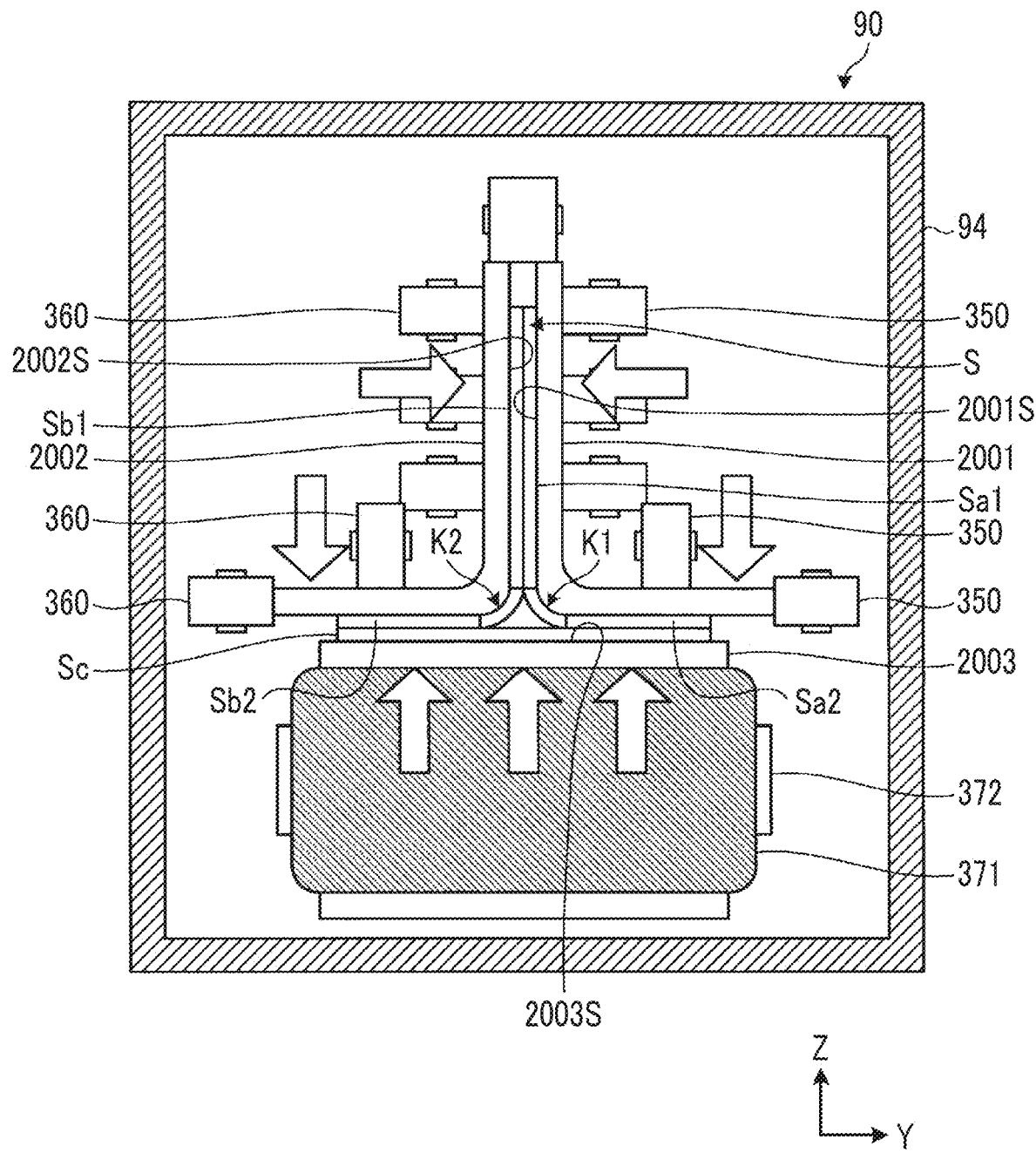
FIG. 8 is a sectional view schematically illustrating the curing device according to the second embodiment.

FIG. 7 is a sectional view illustrating an example of the curing device 90 according to the present embodiment, and corresponds to a sectional view taken along arrow line B-B in FIG. 1. FIG. 8 is a sectional view illustrating a portion of the curing device 90 according to the present embodiment, and corresponds to a sectional view taken along arrow line D-D in FIG. 7.

In the present embodiment, a plurality of separated mold members 2001 and mold members 2002 are disposed in the annular movement route.

In the present embodiment, a moving device 300B which moves the mold member 2001 and the mold member 2002 includes a belt conveyor device which moves the mold member 2001 and the mold member 2002 along the annular the movement route.

The mold member 2001 comes into contact with each of the surface of the portion Sa1 of the intermediate molded article S, the surface of the portion Sat, and the surface of the first bent portion K1.

The mold member 2002 comes into contact with each of the surface of the portion Sb1 of the intermediate molded article S, the surface of the portion Sb2, and the surface of the second bent portion K2.

As illustrated in FIG. 8, in the present embodiment, the mold member 2001 and the mold member 2002 are plate-shaped members having a bent portion. The mold member 2001 and the mold member 2002 are made of metal or reinforced plastic.

In the present embodiment, the mold member 2003 coming into contact with the surface of the intermediate molded article Sc is the belt body including the conveyor belt. A sprocket 371 and a shaft 372 are located inside the mold member 2003.

The mold member 2001 has a contact surface 2001S coming into contact with the intermediate molded article S in the contact section between the contact start position PJa and the contact end position PJb. The mold member 2002 has a contact surface 2002S coming into contact with the intermediate molded article S in the contact section. The mold member 2003 has a contact surface 2003S coming into contact with the intermediate molded article S in the contact section.

In the present embodiment, a plurality of guide rollers 350 for pressing the mold member 2001 against the intermediate molded article S in the contact section, and a plurality of guide rollers 360 for pressing the mold member 2002 against the intermediate molded article S in the contact section are provided.

In addition, in the contact section, the mold member 2003 is pressed against the intermediate molded article S by the sprocket 371.

As illustrated in FIG. 8, the frame member 94 is disposed so as to surround the mold member 2001, the mold member 2002, and the mold member 2003 which are located in the contact section. The frame member 94 is internally equipped with a heater. In a state where the mold member 2001, the mold member 2002, and the mold member 2003 pressurize the intermediate molded article S, the guide roller 350, the guide roller 360, and the sprocket 371 heat and pressurize the intermediate molded article S by using heat radiated from the frame member 94, thereby producing the pultrusion molded article M.

Similar to the above-described embodiment, the contact section is linear. A moving device 300B causes the plurality of mold members 2001 and mold members 2002 which are disposed in the annular movement route to move in the annular movement route. As illustrated in FIG. 7, a portion of the non-contact section of the annular movement route is curved. A gap between the surfaces (contact surfaces 2001S) of the plurality of mold members 2001 in the linear contact section of the movement route is smaller than a gap between the surfaces of the plurality of mold members 2001 in at least a portion of the non-contact section of the movement route. Similarly, a gap between the surfaces (contact surfaces 2002S) of the plurality of mold members 2002 in the linear contact section of the movement route is smaller than a gap between the surfaces of the plurality of mold members 2002 in at least a portion of the non-contact section of the movement route.

Since the contact section is linear, an increase in the pultruding force applied when pultruding the pultrusion molded article M is suppressed. In a case where the contact section where the intermediate molded article S and the mold members 2001 and 2002 come into contact with each other is linear in the annular movement route, at least a portion of the non-contact section where the intermediate molded article S and the mold members 2001 and 2002 do not come into contact with each other is curved. In the non-contact section, a gap between the mold members 2001 and 2002 is increased, thereby enabling the mold members 2001 and 2002 to smoothly move. In the contact section, the gap between the mold members 2001 and 2002 is decreased, thereby suppressing occurrence of a joint portion between the adjacent mold members 2001 and occurrence of a joint portion between the adjacent mold members 2002. In this manner, a possibility is suppressed that the strength of the pultrusion molded article M produced by the twisted reinforcing fiber in the joint portion of the intermediate molded article S may be weakened, or that the quality may become poor since a surface state of the produced pultrusion molded article M is not uniform.

As described above, in the present embodiment, the mold members 2001, 2002, and 2003 also move in the pultruding direction in synchronization with the pultrusion operation of the pultrusion device 110. The movement of the mold members 2001, 2002, and 2003 is controlled so that the moving speed of the contact surface 2001S of the mold member 2001, the moving speed of the contact surface 2002S of the mold member 2002, and the moving speed of the contact surface 2003S of the mold member 2003 are the same as the pultruding speed of the pultrusion device 110. In the present embodiment, it is also possible to suppress the friction when the pultrusion molded article M is pultruded, and it is also possible to efficiently produce the pultrusion molded article M showing high quality.

In addition, in the present embodiment, the guide rollers 350 and 360 which press the mold members 2001 and 2002 against the intermediate molded article S are disposed in the contact section. In this manner, the intermediate molded article S is sufficiently heated and pressurized. Therefore, a possibility is suppressed that the quality of the produced pultrusion molded article M may become poor.

REFERENCE SIGNS LIST 1 production device,
10 reinforcing fiber sheet supply unit,
12 supply reel,
20 reinforcing fiber sheet supply unit,
22 supply reel,
30 reinforcing fiber sheet supply unit,
32 supply reel,
40 reinforcing fiber supply unit,
42 bobbin,
50 resin tank,
60 resin tank,
70 resin tank,
80 resin tank,
90 curing device,
91 entrance,
92 exit,
93 housing,
94 frame member,
100 post curing device,
110 pultrusion device,
200 mold member,
201 annular body (bag body),
201S contact surface,
202 annular body (bag body),
202S contact surface,
203 annular body (belt body),
250 internal space,
300 moving device,
310 moving device,
311 sprocket,
312 sprocket,
313 conveyor belt,
315 driving shaft,
316 driven shaft,
320 moving device,
321 sprocket,
322 sprocket,
323 conveyor belt,
325 driving shaft,
326 driven shaft,
330 moving device,
331 sprocket,
332 sprocket,
335 driving shaft,
336 driven shaft,
350 guide roller,
360 guide roller,
371 sprocket,
372 shaft,
410 first plate portion,
420 second plate portion,
2001 mold member,
2001S contact surface,
2002 mold member,
2002S contact surface,
2003 mold member,
2003S contact surface,
Fa reinforcing fiber sheet,
Fb reinforcing fiber sheet,
Fc reinforcing fiber sheet,
Fd reinforcing fiber,
K1 first bent portion, K2 second bent portion,
M pultrusion molded article,
PJa contact start position,
PJb contact end position,
Ra thermosetting resin,
Rb thermosetting resin,
Rc thermosetting resin,
Rd thermosetting resin,
S intermediate molded article,
Sa intermediate molded article,
Sb intermediate molded article,
Sc intermediate molded article,
Sd intermediate molded article

The invention claimed is:

1. A production device for a pultrusion molded article, comprising:
    a mold member that thermally cures an intermediate molded article by coming into contact with the intermediate molded article having a reinforcing fiber impregnated with a thermosetting resin;
    a pultrusion device that causes a pultrusion molded article produced by thermally curing the intermediate molded article to be pultruded in a pultruding direction; and
    a moving device that moves the mold member in the pultruding direction in synchronization with the pultrusion device,
    wherein the moving device moves the mold member so that a surface of the mold member comes into contact with the intermediate molded article in a contact section from a contact start position to a contact end position in the pultruding direction, the surface of the mold member is separated from the intermediate molded article at the contact end position, and after being separated from the intermediate molded article the surface of the mold member comes into contact with the intermediate molded article by returning to the contact start position,
    wherein the moving device includes a conveyor belt for moving the mold member in an annular movement route including the contact section,
    wherein the mold member includes an annular bag body which is elastically deformable and pressurizes the intermediate molded article, and
    wherein the annular bag body is connected to the conveyor belt to rotationally move by the moving device.

2. The production device for a pultrusion molded article according to claim 1,
    wherein the mold member includes a first mold member and a second mold member, and pinches at least a portion of the intermediate molded article between the first mold member and the second mold member, and
    wherein the moving device moves the first mold member and the second mold member in synchronization with each other.

3. The production device for a pultrusion molded article according to claim 1,
    wherein a plurality of the mold members are disposed in the movement route,
    wherein the moving device moves a plurality of the mold members in the movement route,
    wherein the contact section is linear, and
    wherein a gap between the surfaces of the mold members in the contact section is smaller than a gap between the surfaces of the mold members in at least a portion of a non-contact section of the movement route.

* * * * *